(No Model.)  2 Sheets—Sheet 1.

C. J. HARTLEY.
CORN HARVESTER.

No. 348,627. Patented Sept. 7, 1886.

Witnesses.
C. C. Clark
W. J. Walker

Inventor.
CHARLES J. HARTLEY
By L. P. Graham
atty.

(No Model.) 2 Sheets—Sheet 2.
C. J. HARTLEY.
CORN HARVESTER.
No. 348,627. Patented Sept. 7, 1886.
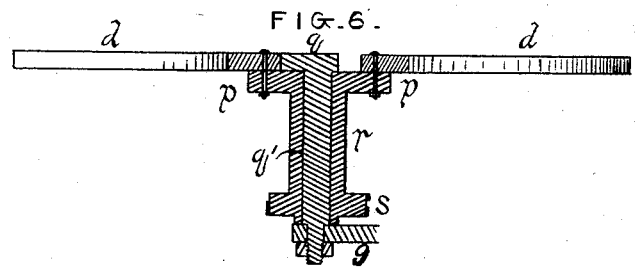
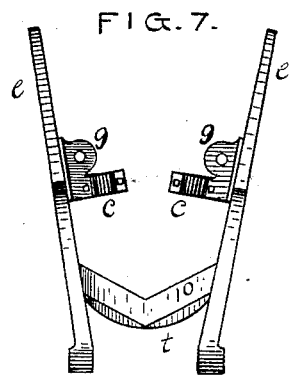
Witnesses
C. C. Clark
W. L. Walker
Inventor
CHARLES J. HARTLEY.
By L. P. Graham
Atty.

UNITED STATES PATENT OFFICE.

CHARLES J. HARTLEY, OF DECATUR, ILLINOIS.

CORN-HARVESTER.

SPECIFICATION forming part of Letters Patent No. 348,627, dated September 7, 1886.

Application filed December 29, 1884. Serial No. 151,472. (No model.)

*To all whom it may concern:*

Be it known that I, CHARLES J. HARTLEY, a resident of the city of Decatur, county of Macon, and State of Illinois, have invented certain new and useful Improvements in Corn-Harvesters, of which the following is a specification.

My invention consists in certain details of construction and combinations of parts, as hereinafter set forth and claimed.

Figure 1:
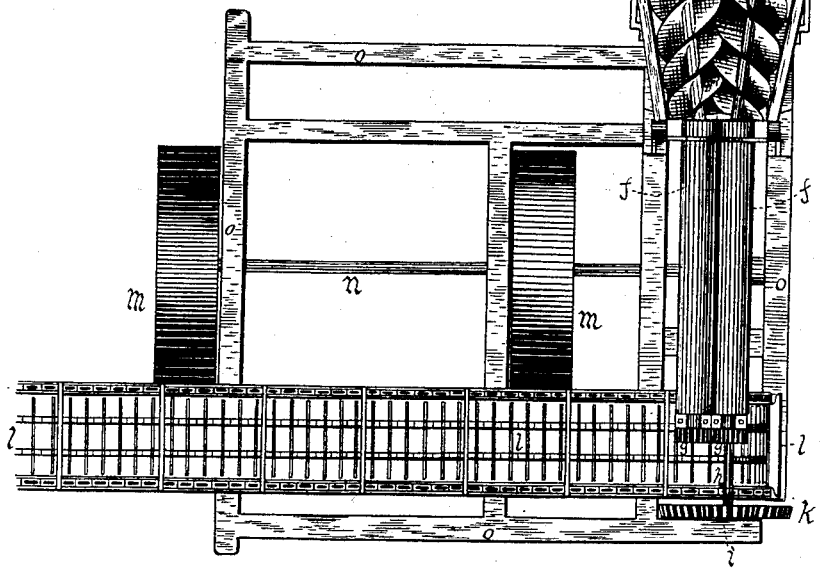
Figure 2:
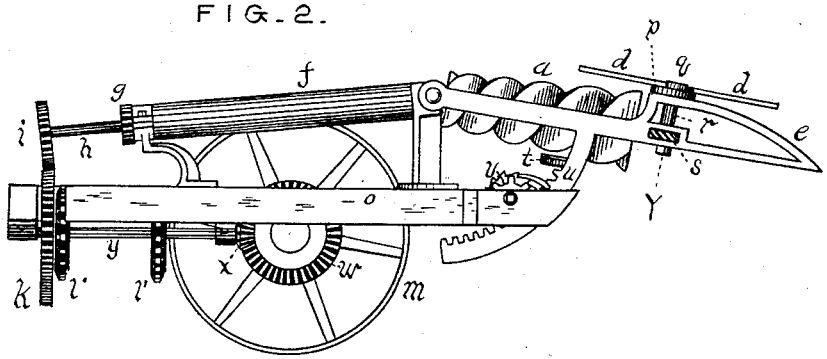
Figure 3:
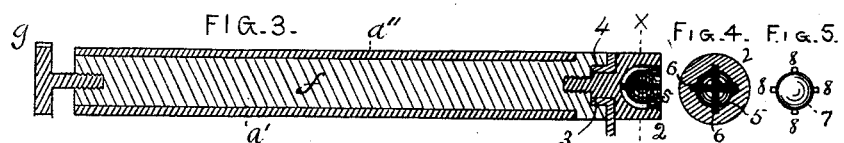
Figures 4, 5:
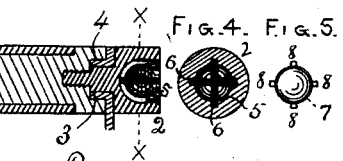

In the drawings accompanying and forming a part of this specification, Figure 1 is a plan of my machine. Fig. 2 is a side elevation of the same. Fig. 3 is a longitudinal central section of one of the husking-rolls. Fig. 4 represents a cross-section of a roll on dotted line $x$ in Fig. 3. Fig. 5 is a view of a universal-joint coupling. Fig. 6 is a vertical section of the shaft of the gathering-arms on dotted line $y$ in Fig. 2, and Fig. 7 is a plan of a portion of my device, drawn for the purpose of showing a cutting-edge which is concealed from view in Fig. 1.

$a\ a$ represent a pair of coacting worms or helices, slightly deflected and tapered.

$b\ b$ represent worm-wheels rigidly attached to the extremities of the shafts of worms $a\ a$.

$c\ c$ are bearings for the shaft of worms $a\ a$.

$d$ indicates two sets of reel-arms pivotally attached to flanges $p$.

$e\ e$ represent a pair of divergent arms hinged to the frame of the harvester and provided with inclined surfaces on their upper outer extremities.

$f\ f$ are husking-rolls parallelly arranged on a slight downward incline to the rear, connected with the shafts of worms $a\ a$ by universal-joint couplings, and having peculiarities of construction to be hereinafter set forth.

$g\ g$ are gear-wheels that connect the husking-rolls.

$h$ is a shaft that conveys motion to the husking-rolls, the worms, and the reel-arms, in the order named.

$i$ is a driven pinion on shaft $h$.

$k$ is a gear-wheel that imparts motion to pinion $i$.

$l$ is an elevator or conveyer for the husked corn.

$m\ m$ are wheels that support and actuate the entire machine.

$n$ is a shaft, to which wheels $m\ m$ and gear-wheel $w$ are attached.

$x$ is a pinion that meshes with wheel $w$ and conveys the motion of the same through shaft $y$ to sprocket-gearing $l'\ l'$ and cog-wheel $k$.

In Fig. 3 the construction of the roller is set forth as follows: $a'$ is a metallic cylinder of the form indicated, and $a''$ is an elastic covering for the same. 2 is a head provided with stud 3 and threaded to screw into cylinder $a'$. 4 represents a bearing for shaft 3, penetrating the end of cylinder $a'$, as indicated. 5 shows a socket in head 2, and 6 indicates intersecting grooves in said socket. 7 represents a ball on the inner termination of a worm-shaft, and 8 indicates projections on the same.

$o$ represents the frame of the machine.

$p$ is a plate on tubular shaft $r$, to which reel-arms $d$ are pivoted.

$q$ is a cam rigidly attached to stationary shaft $q'$. (See Fig. 6.)

$r$ is a tubular shaft that carries arms $d$ and rotates around stationary shaft $q'$.

$s$ is a worm-wheel on tubular shaft $r$, that meshes with and receives motion from a worm-wheel, $b$.

$t$ is a lateral brace for guide-arms $e\ e$ and a support for cutting-edge 10.

$u$ represents one of a pair of curved racks extending downwardly and backwardly from arms $e\ e$.

$v$ is a pinion that meshes with a rack, $u$.

9 9, Fig. 7, indicate bearings for shafts $q'\ r$ and worms $a\ a$. 10, same figure, shows a cutting-edge attached to arms $e\ e$ and brace $t$.

$d'$ indicate heel projections on reel-arms $d$, which are operated by contact with cam $q$.

The power is conveyed from the drive-wheels $m\ m$ through axle $n$, wheel $w$, pinion $x$, shaft $y$, wheel $k$, pinion $i$, shaft $h$, gearing $g\ g$, rolls $f\ f$, worms $a\ a$, screw-gear $b\ s$, tubular shaft $r$, and plate $p$ to reel-arms $d$.

The machine is drawn across the field in the direction indicated by the vertical arrow, and its operation is substantially as follows: The guide-arms pass on opposite sides of a row of corn and confine and arrange the same subject to the operation of reel-arms $d$, all down corn being raised into position by the inclination of the guide-arms. The reel-arms $d$ rotate in the directions indicated by the curved arrows in Fig. 1, and so carry the cornstalks back in contact with the forward ends of the worms. Upon reaching a position over the ends of the worms the heel projections of the reel-arms pass the operative portion of the cam's surface, and said reel-arms swing backward and withdraw from the corn. The worms draw the cornstalks backward and downward until the ears are snapped off, when said ears are conveyed to the rolls and the stalks permitted to pass through the worms. All stalks that do not pass through the machine in proper time will be cut off by knife 10, in order that the progress of said machine may not be retarded. The corn is husked by the rolls and carried by them to the elevator in the customary manner, their inclined position facilitating the latter operation. A wagon should be always under the discharge end of the elevator, in order to receive the corn. As plate $p$ rotates, the heel projections of reel-arms $d$ press against the concentric portion of cam $q$, and hold said reel-arms rigid in a radial position. When the eccentric portion of the cam is reached, the heel projections become released from contact therewith, and the arms are permitted to swing back, and, by rotating in an approximately tangential position, to withdraw from the corn, as before stated. When the concentric portion of the cam is again reached, the heel projections reassume their position in contact with the surface thereof and return the arms to their radial position. When the corn is standing erect, the arms $e$, levers $d$, and worms $a$ should be raised to their highest position by means of the racks and pinions, so that the stalks may be seized near the ears, and thus avoid the necessity of passing the entire length of the stalks through the worms. When, on the contrary, the corn is badly "down," the above-mentioned gathering mechanism must be lowered to conform thereto. The racks and pinions by which the above-mentioned adjustment is effected may be operated by mechanism placed within reach and under the control of the driver, and may be retained in any desired position by a suitable ratchet-wheel and pawl. The corn in the row must be embraced and compacted, and to enable the gathering-arms $d$ to operate effectively their journals should be at least as far apart as the greatest width of a row of corn. The husking-rolls must of course be close together, and in order to have the worms act as conveyers to carry the stalks from the gathering-arms to the husking-rolls the said arms must be deflected in their axes and peripherally tapered, increasing in diameter from the rolls toward the arms. By means of this arrangement the shafts of the worms are sufficiently far apart at their outer or forward ends to readily receive the stalks from the gathering-arms, and the webs are large enough to firmly grasp the same. If, on the contrary, the worms were of uniform diameter and parallel throughout, their outer ends would be too small to coact with the gathering-arms, or their inner ends would be too large to co-operate with the husking-rolls.

From the above it will be understood that the effect of the combined operations of the guides, arms, and worms is to gather the stalks compactly and to convey them toward the rolls, and that the worms snap the ears off the stalks and convey them to the husking-rolls.

Having thus described my invention, I claim as new and desire to secure by Letters Patent—

1. In corn-harvesters, the combination of a pair of husking-rollers and a pair of coacting worm-rollers secured to the ends of the husking-rollers by universal-joint couplings, the shafts of said worm-rollers diverging from the husking-rollers, and the peripheries of the worm-rollers increasing in diameter from the husking-rollers to a degree approximating the divergence of the shafts.

2. In corn-harvesters, the combination of a pair of husking-rollers, a pair of coacting worm-rollers secured to the ends of the husking-rollers by universal-joint couplings, the shafts of said worm-rollers diverging from the husking-rollers, and the peripheries of the worm-rollers increasing in diameter from the husking-rollers to a degree approximating the divergence of the shafts, and a set of reel-arms located at the enlarged end of each worm-roller, said sets of arms having opposite rotation on an approximately-horizontal plane.

3. In corn-harvesters, the combination of a pair of husking-rollers, a pair of coacting worm-rollers secured to the ends of the husking-rollers by universal-joint couplings, the shafts of said worm-rollers diverging from the husking-rollers, and the peripheries of the worm-rollers increasing in diameter from the husking-rollers to a degree approximating the divergence of the shafts, a set of reel-arms located at the enlarged end of each worm-roller, said sets of arms having opposite rotation on an approximately-horizontal plane, and a pair of downwardly and outwardly inclined guide-arms projected in front of the worm-rollers and reel-arms.

4. In corn-harvesters, the combination of a pair of husking-rollers, a pair of co-operating worm-rollers secured to ends of the husking-rollers by universal-joint couplings, the shafts of said worm-rollers diverging from the husking-rollers, and the peripheries of the worm-rollers increasing in diameter from the husking-rollers to a degree approximating the divergence of the shafts, a set of reel-arms located at the enlarged end of each worm-roller, said sets of arms having opposite rotation on an approximately-horizontal plane, a pair of downwardly and outwardly inclined guide-arms projected in front of the worm-rollers and reel-arms, and racks and pinions for elevating and depressing the reel-arms, the guide-arms, and the outer or forward ends of the worm rollers.

5. In corn-harvesters, the combination of a pair of husking-rollers, a pair of co-operating worm-rollers secured to ends of the husking-rollers by universal-joint couplings, the shafts of said worm-rollers diverging from the husking-rollers, and the peripheries of the worm-rollers increasing in diameter from the husking-rollers to a degree approximating the divergence of the shafts, a set of reel-arms located at the enlarged end of each worm-roller, said sets of arms having opposite rotation on an approximately-horizontal plane, a pair of downwardly and outwardly inclined guide-arms projected in front of the worm-rollers and reel-arms, means whereby the reel-arms, guide-arms, and the outer or forward ends of the worm-rollers may be elevated or depressed, and a knife under the worm-rollers with its edge presented toward the large ends of the same.

6. The combination, in corn-harvesters, of reel-arms $d$, provided with heel formations $d'$, tubular shaft $r$, worm-gear wheel $s$, and suitable means of imparting motion thereto, rigid shaft $q'$, cam $q$, and suitable guide-arms to carry the stalks in reach of the reel-arms.

Signed at Decatur in the State of Illinois.

CHARLES J. HARTLEY.

In presence of—
  JOHN K. WARREN,
  BRADFORD K. DURFEE.